United States Patent Office 2,709,828
Patented June 7, 1955

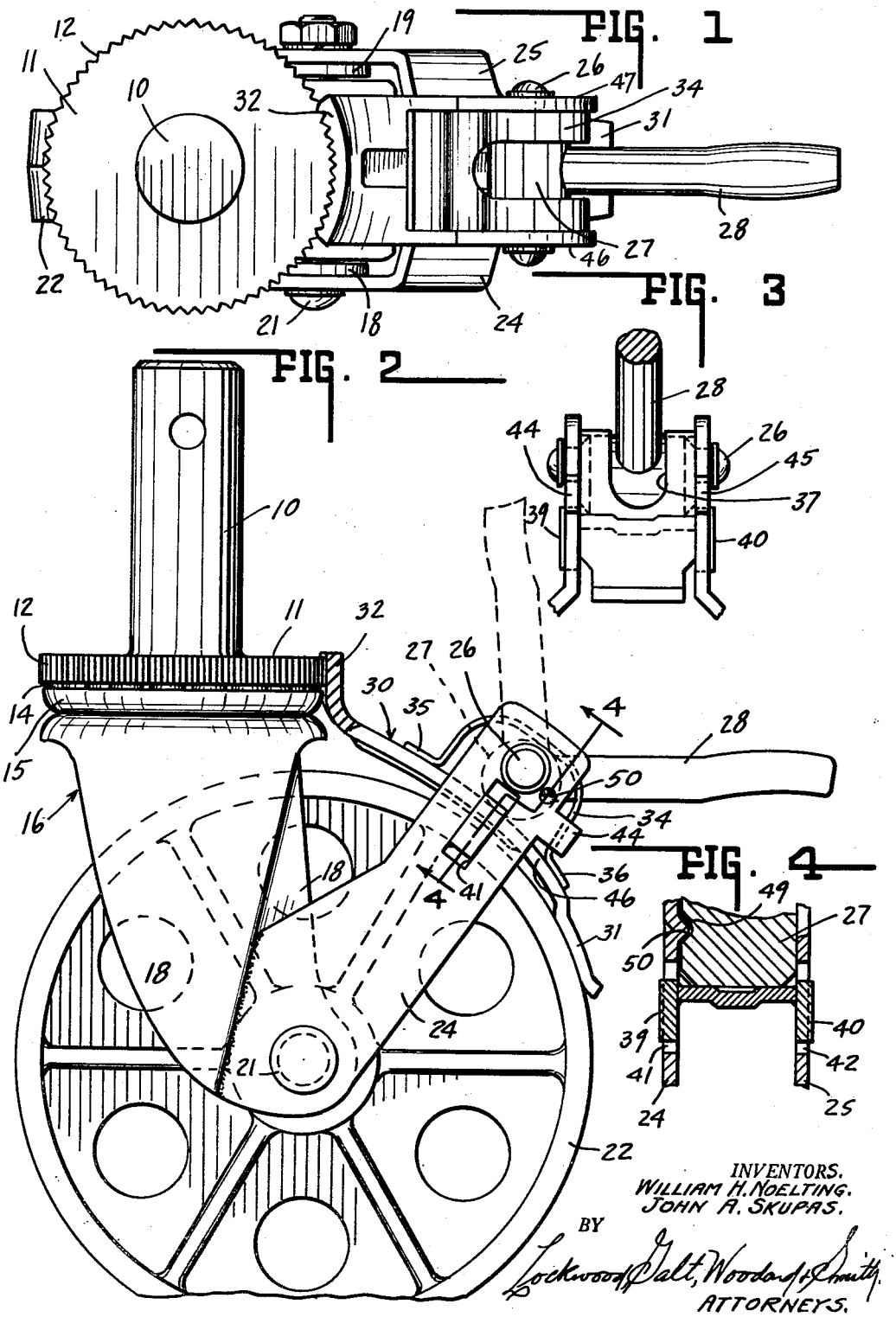

2,709,828

CASTER AND COOPERATING BRAKE

William H. Noelting and John A. Skupas, Evansville, Ind., assignors to Faultless Caster Corporation, Evansville, Ind., a corporation Application July 7, 1952, Serial No. 297,492

3 Claims. (Cl. 16—35)

This invention relates generally to casters and more particularly to heavy casters having brake mechanisms adapted to apply a braking force to a caster wheel and to lock the caster against rotation about its pintle.

Conventional heavy casters include brake mechanisms having facilities for braking the caster wheel against rotation and also for locking the caster wheel against rotation about its pintle. These locking and braking mechanisms are operated by a cam or lever or other mechanism which is intended simultaneously to release braking pressure and locking pressure. However, it is found in actual practice that these conventional mechanisms do not operate satisfactorily due to the fact that they sometimes operate to relieve braking pressure but fail to release as to the locking function. Also, conventional mechanisms of this character usually rely entirely on frictional contact for providing the locking action and, as is well known, frictional contact is unreliable when used for locking purposes.

Accordingly, it is the principal object of this invention to provide, in a caster mechanism, a combined brake and lock to simultaneously apply brake pressure to a caster wheel and a locking action with respect to a pintle for preventing rotation of the caster with respect to its pintle.

Another object of this invention is to provide, in a caster mechanism, a cam operated wheel brake and pintle lock which functions simultaneously to release both with respect to brake pressure and with respect to locking action.

In accordance with this invention there is provided, in a caster mechanism, a combined brake and lock adapted to be normally operated by a cam and lever through a translatory movement for simultaneously relieving brake pressure on the caster wheel and positively releasing the locking action with respect to the pintle of the caster.

The full nature of the invention will be understood from the accompanying drawings and the following description and claims:

Fig. 1 is a top plan view of the caster and brake mechanism provided in accordance with this invention.

Fig. 2 is a side elevataion of the caster illustrated in Fig. 1

Fig. 3 is a detailed view of the cam and brake mechanism illustrated in Figs. 1 and 2.

Fig. 4 is a partial cross sectional view taken on line 4—4 of Fig. 2.

Referring to Figs. 1 and 2 of the drawings there is provided in accordance with this invention a heavy duty caster comprising a pintle 10 which is adapted to be received in the tubular leg of conventional metal staging apparatus or the leg of any other conventional relatively heavy and movable apparatus. At the base of pintle 10 there is provided a load plate 11, the outer periphery of which is serrated or provided with teeth as at 12 for providing a locking surface as will be described subsequently. Load plate 11 is fixed to pintle 10 and rides on conventional roller or ball bearings 14 supported in a cup bearing race 15. A yoke or horn 16 may be welded or otherwise attached to the bearing race 15, and these two elements may be pivotally supported on the pintle 10 in conventional fashion. Horn 16 comprises a pair of leg members 18 and 19 having at their lower ends apertures for receiving an axle 21 for rotatably supporting the caster wheel 22. Axle 21 may be in the form of a bolt or other suitable shaft upon which the wheel 22 may rotate.

For supporting the braking and locking mechanism there are provided a pair of upwardly extending arms 24 and 25 welded or otherwise attached to the horns 18 and 19, respectively. At the upper ends of arms 24 and 25 beyond the periphery of caster wheel 22 apertures are provided in arms 24 and 25 for receiving an axle 26 on which may be rotatably mounted a cam 27 and lever 28. Between cam 27 and the periphery of wheel 22 there is mounted a brake shoe 30, the right hand end of which includes a wheel engaging portion 31 for applying braking pressure to the wheel 22, and the left hand end of which includes a serrated locking member 32 adapted to meet and engage with the serrations 12 in the load plate 11 thereby to prevent horn 16 from rotating about pintle 10. The brake shoe 30 is provided with a U-shaped yoke 34 embracing cam 27 and consisting of legs having feet 35 and 36 attached to brake shoe 30. The base portion of yoke 34 may be slotted as at 37 (Fig. 2) for receiving the handle 28 and permitting its rotation for moving the cam 27 from one operative position to another. Brake shoe 30 also includes a pair of guides 39 and 40 which move within a pair of slots in the arms 24, 25, such for example as the slot 41 in arm 24. The arm 25 includes a similar slot 42 as shown in Fig. 4. The guides 39 and 40 are elongated sufficiently to normally limit the movement of brake shoe 30 to a radial translatory movement toward and away from the periphery of wheel 22 and radially of the axle 21 of wheel 22. In other words, pivotal movement of shoe 30 is prevented. The action of guides 39 and 40 insures that the ends 31 and 32 of brake shoe 30 move away from the peripheries of the wheel 22 and the load plate 11, respectively, thereby simultaneously to release the wheel and unlock the load plate. The arms 24 and 25 are further provided with a pair of lugs 44 and 45 which project outwardly of the arms 24 and 25 over the side portions 46 and 47 of the brake shoe 30 in position to be engaged thereby.

For locking the cam 27 and lever 28 in the dotted line or release position illustrated in Fig. 2, the cam 27 is provided with a depression 49, and the arm 24 is provided with a cooperating inwardly directed projection 50, these two cooperating parts being adapted to function when lever 28 is in its dotted line position.

In operation the apparatus carried by the caster may be moved to braking position and locked in this position by rotating the lever 28 and therewith the cam 27 in a clockwise direction, whereby the cam moves the brake shoe 30 radially of wheel 22 under the control of the guides 39 and 40 until portion 31 engages the periphery of wheel 22 and locking member 32 engages the serrated edge of load plate 11. This motion is entirely translatory by reason of the action of guides 39 and 40. By exerting a substantial amount of pressure on lever 28, wheel 22 is locked against rotation, and the wheel 22 is also locked against axial rotation about the pintle 10. Locking action is maintained due to the over center and frictional engagement between cam 27 and shoe 30.

When it is desired to release the brake and locking mechanism, cam 27 and lever 28 may be rotated in a counterclockwise direction, whereby the cam 27 engages the upper portion of yoke 34 and lifts brake shoe 30 moving it outwardly and radially of wheel 22. This movement is purely translatory as the guides 39 and 40 permit only such translatory movement. During rotation of cam 37 the portion 31 of brake shoe 30 disengages from the periphery of wheel 22; and if there is no play of any sort in the cam and brake shoe mechanism, the locking member 32 of brake shoe 30 will disengage from the serrated edge 12 of load plate 11. In the event that wear and tear have caused play to exist in the cam and and brake shoe mechanism, or if locking member 32 tends to stick with respect to the teeth of plate 11, full release of said member 32 is directly achieved by engagement of lugs 44 and 45 with the right hand end of brake shoe 30, whereby there is a prying action which moves locking member 32 out of engagement with the teeth of load plate 11.

From the foregoing description it will be apparent that there is provided in accordance with this invention a positively acting brake and lock mechanism which functions to apply braking force to the caster wheel and axial locking action. On the other hand, it will also be apparent that the mechanism is characterized by its inherent ability simultaneously to release the brake pressure and locking action by means of a translatory action or movement.

While the invention has been described as comprising a cam 27 and lever 28, operable to the full line position shown in Fig. 2 for applying the brake to the wheel, it will be obvious to those skilled in the art that the operation of cam 27 and lever 28 may be reversed by arranging the lever with respect to the cam so that the cam may apply the brake when the lever is moved to the dotted line position shown in Fig. 2. This alternative arrangement prevents the application of the brake through accidental lowering of lever 28 because lever 28 would then be in the full line position when the brake is released, and the effects of gravity would tend to release the brake rather than apply it.

The invention claimed is:

1. A caster comprising a wheel, a pintle, a horn rotatably mounted on said pintle and including an axle rotatably supporting said wheel, a load supporting plate fixed to said pintle, said plate having serrations on its outer periphery, a pair of arms fixed to said horn and extending radially of and beyond the periphery of said wheel, a cam pivotally mounted between the ends of said arms, a brake shoe including a yoke embracing said cam whereby rotation thereof imparts radial translatory motion to said brake shoe with respect to said wheel, said brake shoe comprising a portion extending toward the periphery of said wheel for engaging it and a portion having serrations adapted to engage the serrations on said load supporting plate, each of said arms including a guide slot and said brake shoe including guides in said slots for normally limiting the motion of said brake shoe to said translatory motion, and a lug on each of said arms positioned for engagement by said brake shoe in event of wear causing free play between said guides and slots for limiting the outward motion of the wheel engaging end thereof to pry the serrated portion free of engagement with the serrations of said load supporting plate.

2. A caster comprising a wheel, a pintle, a horn rotatably mounted on said pintle and including an axle rotatably supporting said wheel, a load supporting plate fixed to said pintle, said plate having serrations on its outer periphery, a pair of arms fixed to said horn and extending radially of and beyond the periphery of said wheel, a cam pivotally mounted between the ends of said arms, a brake shoe including a yoke embracing said cam whereby rotation thereof imparts radial translatory motion of said brake shoe with respect to said wheel, said brake shoe comprising a portion extending toward the periphery of said wheel for engaging it and a portion having serrations adapted to engage the serrations on said load supporting plate, said arms and said brake shoe including cooperating guide means for normally limiting the motion of said brake shoe to said translatory motion, and a lug on each of said arms positioned for engagement by said brake shoe in event of wear causing free play between said guides and slots for limiting the outward motion of the wheel engaging end thereof to pry the serrated portion free of engagement with the serrations of said load supporting plate.

3. A caster comprising a wheel, a pintle, a horn rotatably mounted on said pintle and including an axle rotatably supporting said wheel, a load supporting plate fixed to said pintle, said plate having an irregular outer periphery, a pair of arms fixed to said horn and extending radially of and beyond the periphery of said wheel, a cam pivotally mounted between the ends of said arms, a brake shoe operatively associated with said cam whereby rotation thereof imparts radial translatory motion to said brake shoe with respect to said wheel, said brake shoe comprising a portion extending toward the periphery of said wheel for engaging it and a portion having an irregular surface adapted to engage and interlock with the the periphery of said load supporting plate, said arms and said brake shoe including cooperating guide means for normally limiting the motion of said brake shoe to said translatory motion, and cooperating means on each of said arms positioned for engagement by said brake shoe in event of wear causing free play for limiting the outward motion of the wheel engaging end to pry said irregular surfaced portion free of engagement with the periphery of said load supporting plate.

References Cited in the file of this patent

UNITED STATES PATENTS

| | | |
|---|---|---|
| 1,633,638 | Jarvis et al. | June 28, 1927 |
| 2,262,433 | Uecker et al. | Nov. 11, 1941 |
| 2,366,927 | Noelting et al. | Jan. 9, 1945 |
| 2,434,863 | Parkhill | Jan. 20, 1948 |
| 2,484,094 | Jackson | Oct. 11, 1949 |